United States Patent [19]
Lee et al.

[11] Patent Number: 5,156,526
[45] Date of Patent: Oct. 20, 1992

[54] ROTATION ENHANCED ROTOR BLADE COOLING USING A SINGLE ROW OF COOLANT PASSAGEWAYS

[75] Inventors: Ching-Pang Lee, Cincinnati; Theodore T. Thomas, Jr., Loveland, both of Ohio

[73] Assignee: General Electric Company, Cincinnati, Ohio

[21] Appl. No.: 628,871

[22] Filed: Dec. 18, 1990

[51] Int. Cl.$^5$ .......................... B63H 1/14; B63H 7/02
[52] U.S. Cl. ...................................... 416/97 R; 416/95
[58] Field of Search ...................... 416/95, 97 R, 97 A, 416/96 R; 415/115

[56] References Cited

U.S. PATENT DOCUMENTS

| | | | |
|---|---|---|---|
| 3,191,908 | 6/1965 | Powell et al. | 416/96 |
| 3,628,885 | 12/1971 | Sidenstick et al. | 416/97 |
| 3,801,218 | 4/1974 | Moore | 416/96 |
| 3,891,348 | 6/1975 | Auxier | 416/97 |
| 4,073,599 | 2/1978 | Allen et al. | 416/97 |
| 4,180,373 | 12/1979 | Moore et al. | 416/97 |
| 4,236,870 | 12/1980 | Hucul et al. | 416/97 |
| 4,257,737 | 3/1981 | Andress et al. | 416/97 |
| 4,303,374 | 12/1981 | Braddy | 416/97 |
| 4,474,532 | 10/1984 | Pazder | 416/97 |
| 4,601,638 | 7/1986 | Hill et al. | 416/97 |
| 4,604,031 | 8/1986 | Moss et al. | 416/97 |
| 4,627,480 | 12/1986 | Lee | 164/369 |
| 4,786,233 | 11/1988 | Shizuya et al. | 416/97 |
| 4,940,388 | 7/1990 | Lilleker | 416/97 R |

FOREIGN PATENT DOCUMENTS

| | | | |
|---|---|---|---|
| 715421 | 11/1941 | Fed. Rep. of Germany | 416/97 R |
| 468865 | 2/1952 | Italy | 416/95 |
| 2165315 | 4/1986 | United Kingdom | 416/96 R |

OTHER PUBLICATIONS

"Heat Transfer in Rotating Passages with Smooth Walls and Radial Outward Flow" by J. H. Wagner, B. V. Johnson and T. J. Hajek, presented at the Gas Turbine and Aeroengine Congress and Exposition on Jun. 4-8, 1989, Toronto, Canada.

"Heat Transfer in Rotating Serpentine Passages with Smooth Walls", by J. H. Wagner, B. V. Johnson and F. C. Kopper, presented at the Gas Turbine and Aeroengine Congress and Exposition on Jun. 11-14, Brussels, Belgium.

*Primary Examiner*—Thomas E. Denion
*Attorney, Agent, or Firm*—Douglas E. Erickson; Jerome C. Squillaro

[57] ABSTRACT

A rotor blade such as a turbine rotor blade for a jet engine. The airfoil blade portion of the rotor blade has a plurality of longitudinally extending coolant passageways preferably interconnected to define a serpentine coolant circuit. Each passageway has a wedge shape including a base and an opposing tapered tip. For passageways channeling coolant from the blade root to the blade tip, the bases are positioned proximate the pressure side of the airfoil blade and the tapered tip is positioned proximate the suction side of the airfoil blade to take advantage of the Coriolis force acting on the coolant in the passageway of the rotating blade to improve overall heat transfer effectiveness.

14 Claims, 2 Drawing Sheets

5,156,526

ROTATION ENHANCED ROTOR BLADE COOLING USING A SINGLE ROW OF COOLANT PASSAGEWAYS

CROSS-REFERENCE TO RELATED APPLICATIONS

Reference is hereby made to the following copending applications dealing with related subject matter and assigned to the assignee of the present invention:

1. The inventors of the present invention have concurrently filed a related patent application entitled "Rotation Enhanced Rotor Blade Cooling Using A Double Row Of Coolant Passageways".

2. "Internally Cooled Airfoil Blade" by Ching-Pang Lee et al, filed Oct. 12, 1989, and assigned U.S. Ser. No. 07/415,756.

BACKGROUND OF THE INVENTION

The present invention relates generally to rotor blades (such as those used in turbines, compressors, fans, and the like in a gas turbine engine), and more particularly to such a rotor blade having improved internal cooling.

Gas turbine engines, such as aircraft jet engines, include turbines having rotor blades. A turbine rotor blade has a shank which is attached to a rotating turbine rotor disk and an airfoil blade which is employed to extract useful work from the hot gasses exiting the engine's combustor. The airfoil blade includes a blade root which is attached to the shank and a blade tip which is the free end of the airfoil blade. Modern aircraft jet engines have employed internal cooling of turbine rotor blades to keep the airfoil blade temperatures within design limits. Typically, the airfoil blade portion of the turbine rotor blade is cooled by air (typically bled from the engine's compressor) passing through a longitudinally extending cylindrical internal passage, with the air entering near the airfoil blade root and exiting near the airfoil blade tip. Known turbine blade cooling passages include a cooling circuit comprising a plurality of unconnected longitudinally-oriented passages each receiving cooling air from near the airfoil blade root and channeling the air longitudinally toward the airfoil blade tip. Other known cooling circuits include a serpentine cooling circuit comprising a plurality of longitudinally-oriented passages which are series-connected to produce serpentine flow. For either cooling circuit, some air also exits the airfoil blade through film cooling holes near the airfoil blade's leading edge, and some air exits the airfoil blade through trailing edge cooling holes.

Cooling passages typically have circular, rectangular, square or oblong transverse cross-sectional shapes. It is known that for a rotating airfoil blade having a serpentine cooling circuit including longitudinally-oriented cooling passages of square cross-sectional shape, Coriolis (rotation) forces will increase the heat transfer coefficient (by a factor of more than two in one reported experiment) along certain walls of the passage and decrease the heat transfer coefficient (by a factor of more than two in the reported experiment) along other walls of the passage as compared with a non-rotating airfoil. Basically, the Coriolis force is proportional to the vector cross product of the velocity vector of the coolant flowing through the passage and the angular velocity vector of the rotating airfoil blade. The Coriolis force compresses the coolant against one side of the square passage increasing the heat transfer at that side while decreasing the heat transfer at the opposite side. This creates an uneven transverse cross section blade temperature profile which creates hot areas that must be compensated for by, for example, increasing the cooling flow. Increasing the cooling flow could be accomplished by bleeding off more engine compressor air, but this would reduce the engine's efficiency by reducing the number of miles flown for each gallon of fuel consumed. What is needed is a cooling passage configuration which takes advantage of, rather than suffers from, the effects of Coriolis forces on the effectiveness of transferring heat from the airfoil blade to the coolant.

SUMMARY OF THE INVENTION

It is an object of the invention to provide a rotor blade having improved internal cooling.

It is an added object of the invention to provide such a rotor blade which takes advantage of, rather than suffers from, the effects of Coriolis forces on heat transfer effectiveness in a rotating airfoil.

It is an additional object of the invention to provide such a rotor blade which achieves a more uniform transverse cross section blade temperature profile.

In a first embodiment of the invention, the rotor blade includes a shank and an airfoil blade. The airfoil blade has a pressure side and a suction side joined together to define an airfoil shape. The airfoil blade additionally has a blade tip and a blade root, with the blade root attached to the shank. The airfoil blade also has a longitudinal axis extending outward toward the blade tip and inward toward the blade root. The airfoil blade further has Walls defining a generally longitudinally extending coolant passageway for channeling coolant longitudinally outward. The passageway may be a straight-through passageway or may be a part of a serpentine cooling circuit. The coolant passageway has a transverse cross-sectional shape of generally a wedge which has a base and an opposing tapered tip. The base is positioned near the pressure side of the airfoil blade, and the tapered tip is positioned near the suction side of the airfoil blade. The wedge also has sides connecting the base to the tapered tip, wherein each of the sides of the wedge is not aligned with the pressure side or the suction side of the airfoil blade. As the rotor blade rotates, Coriolis force will compress the coolant against the base increasing its heat transfer effectiveness and decompress the coolant from the tapered tip decreasing its heat transfer effectiveness. The invention compensates for these Coriolis (rotation) effects since the wedge shape of the coolant passageway requires the length of the base to be longer than the width of the tapered tip. This increases the heat transfer gain of the base and decreases the heat transfer loss of the tapered tip. In a preferred embodiment, the wedge is a generally triangular wedge whose base is aligned generally with the pressure side of the airfoil blade.

In a second embodiment of the invention, the rotor blade includes a shank and an airfoil blade. The airfoil blade has a pressure side and a suction side joined together to define an airfoil shape. The airfoil blade additionally has a blade tip and a blade root, with the blade root attached to the shank. The airfoil blade also has a longitudinal axis extending outward toward the blade tip and inward toward the blade root. The airfoil blade further has walls defining a generally longitudinally extending coolant passageway for channeling coolant longitudinally inward. The passageway may be a straight-through passageway or may be a part of a serpentine cooling circuit. The coolant passageway has a transverse cross-sectional shape of generally a wedge which has a base and an opposing tapered tip. The base, which has a length at least twice the width of the tapered tip, is positioned near the suction side of the airfoil blade, and the tapered tip is positioned near the pressure side of the airfoil blade. The wedge also has sides connecting the base to the tapered tip, wherein each of the sides of the wedge is not aligned with the pressure side or the suction side of the airfoil blade. As the rotor blade rotates, Coriolis force will compress the coolant against the longer base and decompress the coolant from the shorter tapered tip, just as in the first embodiment previously discussed. In a preferred embodiment, the wedge is a generally triangular wedge whose base is aligned generally with the suction side of the airfoil blade.

In a third embodiment, the first two embodiments are generally combined in a serpentine coolant passage. Here, the rotor blade includes a shank and an airfoil blade. The airfoil blade has a pressure side and a suction side joined together to define an airfoil shape. The airfoil blade additionally has a blade tip and a blade root, with the blade root attached to the shank. The airfoil blade also has a longitudinal axis extending outward toward the blade tip and inward toward the blade root. The airfoil blade further has walls defining at least two generally longitudinally extending coolant passageways disposed in a row with adjacent passageways interconnected to define at least a portion of a serpentine coolant circuit. Each coolant passageway has a transverse cross-sectional shape of generally a wedge which has a base and an opposing tapered tip. The base of one of any two adjacent coolant passageways is positioned near the pressure side of the airfoil blade and the tapered tip of the one passageway is positioned near the suction side of the airfoil blade, and the base of the other of the two adjacent coolant passages is positioned near the suction side of the airfoil blade and the tapered tip of the other passageway is positioned near the pressure side of the airfoil blade. In a preferred embodiment of at least three coolant passageways, each wedge is a generally triangular wedge whose base is aligned generally with the corresponding proximate side of the airfoil blade.

Several benefits and advantages are derived from the invention which provides a rotor blade, such as a turbine blade of a gas turbine engine, with improved internal cooling. The transverse cross-sectional wedge shape of the longitudinally extending coolant passageways takes advantage of the effects of Coriolis force on heat transfer effectiveness in coolant passageways of rotating rotor blades. The invention positions the longer base of the wedge near the pressure side of the airfoil blade for radially outward flow (from blade root to blade tip) and positions the longer base of the wedge near the suction side of the airfoil blade for radially inward flow (from blade tip to blade root) to achieve a more uniform transverse cross section blade temperature profile. Such a design minimizes the heat transfer losses and maximizes the heat transfer gains so that a turbine rotor blade may be cooled using less cooling air. Since the cooling air is typically bled from the compressor, minimizing the amount of air required for cooling purposes will leave more air for the combustor which will increase engine efficiency.

BRIEF DESCRIPTION OF THE DRAWINGS

The accompanying drawings illustrate various preferred embodiments of the present invention wherein.

DETAILED DESCRIPTION OF THE INVENTION

Figure 1:
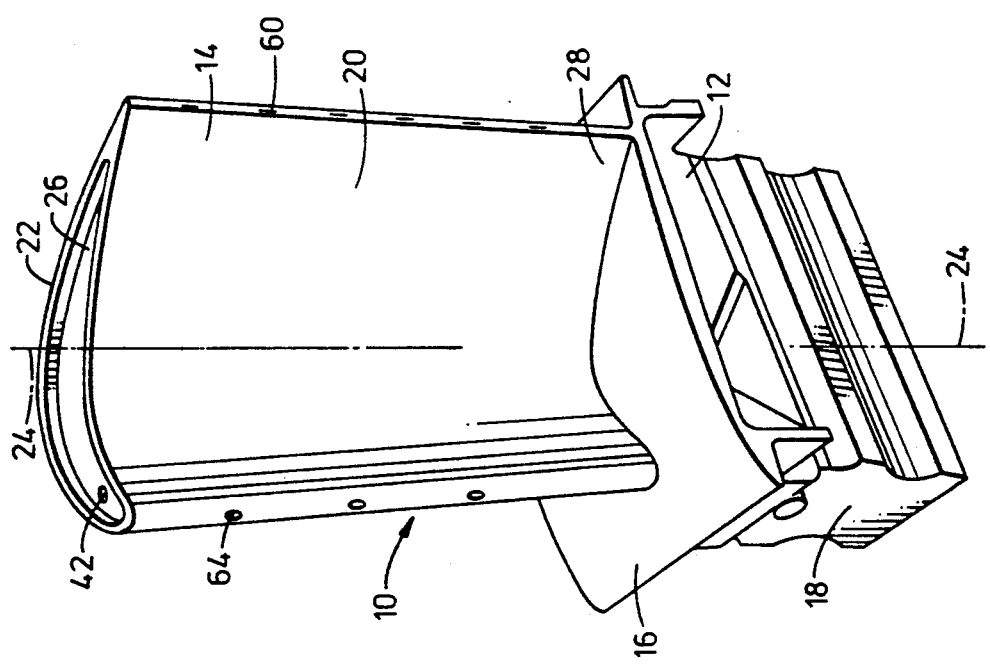
FIG. 1 is a perspective view of a gas turbine engine rotor blade which incorporates the invention.

A gas turbine engine rotor blade, shown in FIG. 1 as an aircraft jet engine turbine rotor blade 10, includes a shank 12 and an airfoil blade 14. The shank 12 includes a blade platform 16, which helps to radially contain the turbine air flow, and a dovetail 18, which attaches to a turbine rotor disc (not shown). The airfoil blade 14 has a concave-shaped or pressure side 20 and a convex-shaped or suction side 22 which are joined together to define an airfoil shape. A longitudinal axis 24 extends radially outward toward the blade tip 26 and radially inward toward the blade root 28 which is attached to the shank 12. The rotor blade rotates in a direction such that its airfoil blade pressure side 20 follows its airfoil blade suction side 22. Therefore, the rotor blade 10 shown in FIG. 1 would rotate into the page.

Figure 2:
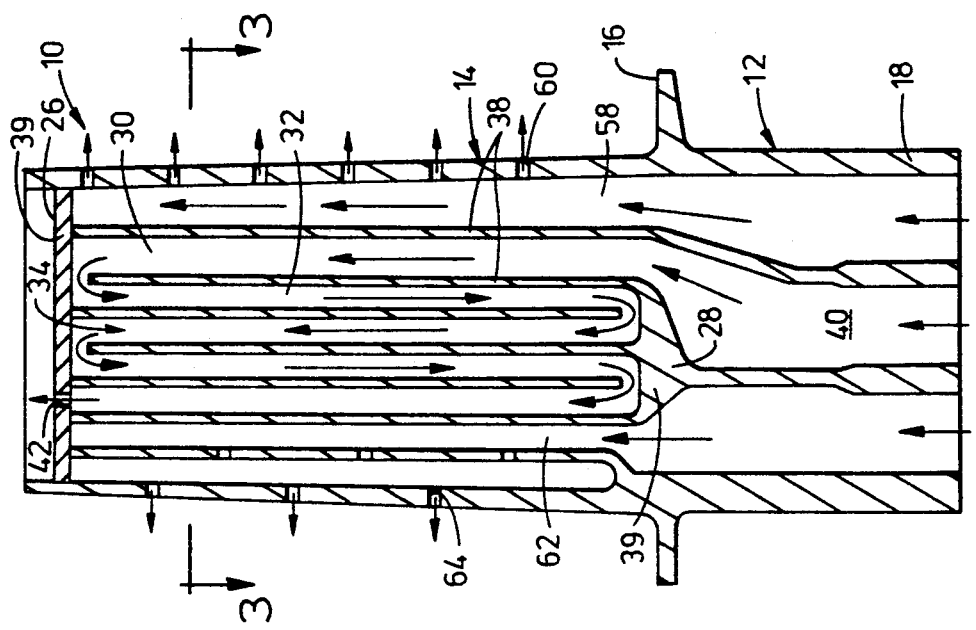
FIG. 2 is a longitudinal cross section of the rotor blade of FIG. 1.
Figure 3:
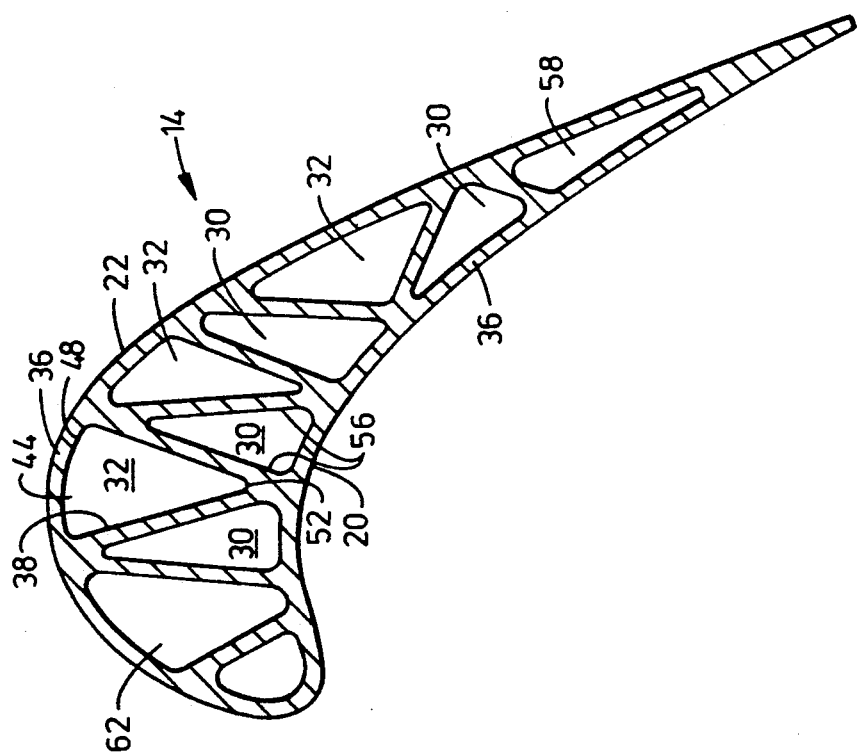
FIG. 3 is a cross sectional view of the airfoil blade portion of the rotor blade of FIG. 1 taken along lines 3—3 of FIG. 2 showing the triangular wedge shape of the longitudinal passageways (with two passageways added) when viewed in transverse cross section.

As shown in FIGS. 2 and 3, the airfoil blade further has walls defining a plurality of (and preferably at least three) generally longitudinally extending internal coolant passageways 30 and 32. In the figures, the unnumbered arrows denote the direction of coolant flow. The passageways 30 and 32 are disposed in a row with adjacent passageways interconnected to define at least a portion of a serpentine coolant circuit 34. The walls include longitudinally extending outside walls 36 (whose exterior surfaces define the pressure and suction sides 20 and 22 of the airfoil blade 14), longitudinally extending inside walls 38, and transversely extending blade tip and blade root walls 39. The serpentine coolant circuit 34 receives coolant from a coolant entranceway 40 in the shank 12. After coursing through the circuit 34, coolant exits the airfoil blade 14 through holes 42 in the blade tip 26. The coolant passageways 30 and 32 of the serpentine coolant circuit 34 are seen to be comprised of coolant passageways 30 for channeling coolant longitudinally (radially) outward toward the blade tip 26 and coolant passageways 32 for channeling coolant longitudinally (radially) inward toward the blade root 28.

Figure 4:
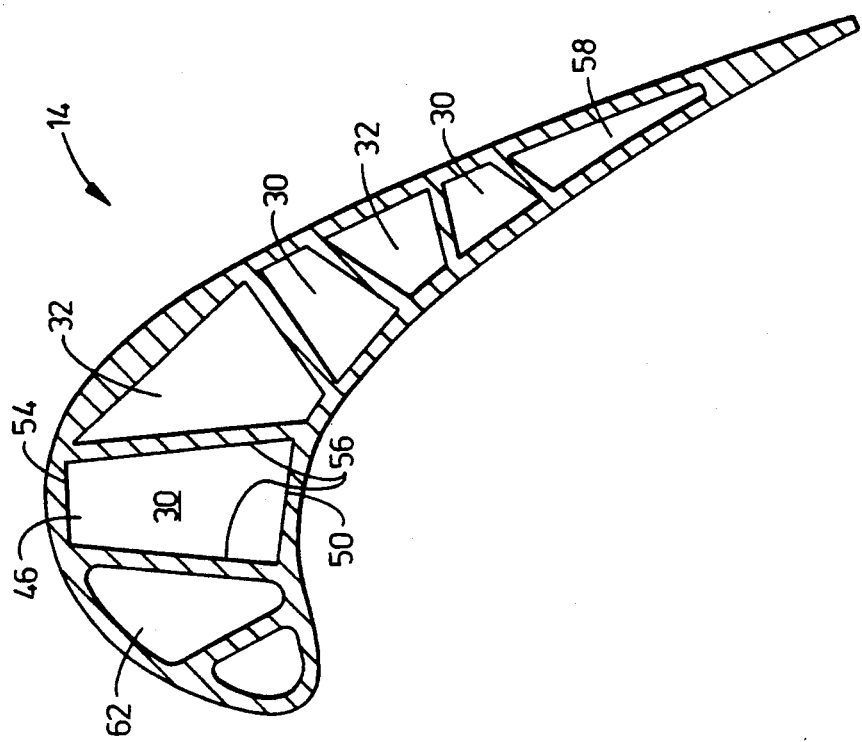
FIG. 4 is the view of FIG. 3 for an alternate embodiment of the invention wherein the longitudinal passageways have a trapezoidal wedge shape when viewed in transverse cross section.

Each of the coolant passageways 30 and 32 has a transverse cross-sectional shape of generally a wedge 44 and 46. Exemplary wedge shapes include triangular wedges 44, as shown in FIG. 3, and trapezoidal wedges 46, as shown in the alternate embodiment of FIG. 4. A general wedge shape is defined to be a closed figure having a base 48 and 50, a tapered tip 52 and 54 opposing the base 48 and 50, and two sides 56 extending from the base 48 and 50 to the tapered tip 52 and 54. Each of the sides 56 of the wedge 44 and 46 is not aligned with the pressure side 20 or the suction side 22 of the airfoil blade 14. The tapered tip 52 may have zero width as with the point 52 of a triangular wedge 44, or the tapered tip 54 may have a width which is the length of the smaller base 54 of a trapezoidal wedge 46. The length of the base 48 and 50 is always greater than, and preferably at least twice as great as, the width of the tapered tip 52 and 54.

Each outward channeling passageway 30 has its base 48 and 50 disposed proximate (and preferably aligned generally with) the pressure side 20 of the airfoil blade 14 and has its opposing tapered tip 52 and 54 disposed proximate the suction side 22 of the airfoil blade 14. Each inward channeling passageway 32 has its base 48 and 50 disposed proximate (and preferably aligned generally with) the suction side 22 of the airfoil blade 14 and has its opposing tapered tip 52 and 54 disposed proximate the pressure side 20 of the airfoil blade 14. Thus, in the serpentine coolant circuit 34, it is seen that the base 48 and 50 of one of any two adjacent passageways 30 and 32 is disposed proximate (and preferably aligned generally with) the pressure side 20 and the tapered tip 52 and 54 of that one passageway 30 and 32 is disposed proximate the suction side 22 of the airfoil blade 14, while the base 48 and 50 of the other of the two adjacent passageways 30 and 32 is disposed proximate (and preferably aligned generally with) the suction side 22 and the tapered tip 52 and 54 of that other passageway 30 and 32 is disposed proximate the pressure side 20 of the airfoil blade 14.

Although not part of the present invention, the rotor blade also includes trailing edge and leading edge cooling circuits with coolant entering a trailing edge conduit 58 and exiting through trailing edge openings 60 and with coolant entering a leading edge conduit 62 and exiting through leading edge film cooling hole openings 64.

It is noted that the invention provides an improved gas turbine engine internally cooled rotor blade, one which compensates for, and takes advantage of, Coriolis (rotation) effects on heat transfer effectiveness. It is understood that the rotor blade of the invention is not limited to aircraft jet engines but may be incorporated into other gas turbine engines or into any rotating machinery having a turbine, compressor, booster, or fan blade, or the like, and that the coolant may be a gas (such as air) and/or a liquid.

The foregoing description of preferred embodiments of the invention has been presented for purposes of illustration. It is not intended to be exhaustive or to limit the invention to the precise form disclosed, and obviously many modifications and variations are possible in light of the above teachings all of which are within the scope of the claims appended hereto.

We claim:

1. A rotor blade comprising a shank and an airfoil blade, said airfoil blade having:
   (a) a pressure side;
   (b) a suction side, said sides joined together to define an airfoil shape;
   (c) a blade root attached to said shank;
   (d) a blade tip;
   (e) a longitudinal axis extending outward toward said blade tip and inward toward said blade root; and
   (f) walls defining a first generally longitudinally extending coolant passageway for channeling coolant longitudinally outward, said first passageway having a transverse cross-sectional shape of generally a wedge including a base disposed proximate said pressure side of said airfoil blade, an opposing tapered tip disposed proximate said suction side of said airfoil blade, and sides connecting said base to said tapered tip, wherein each of said sides of said wedge is not aligned with said pressure side or said suction side of said airfoil blade.

2. The rotor blade of claim 1, wherein said walls also define a second generally longitudinally extending coolant passageway for channeling coolant longitudinally inward, said second passageway having a transverse cross-sectional shape of generally a wedge including a base disposed proximate said suction side of said airfoil blade, an opposing tapered tip disposed proximate said pressure side of said airfoil blade, and sides connecting said base to said tapered tip, wherein each of said sides of said wedge is not aligned with said pressure side or said suction side of said airfoil blade.

3. The rotor blade of claim 1, wherein said base of said wedge is aligned generally with said pressure side of said airfoil blade.

4. The rotor blade of claim 1, wherein said wedge has a shape of generally a trapezoid.

5. The rotor blade of claim 1, wherein said wedge has a shape of generally a triangle.

6. A rotor blade comprising a shank and an airfoil blade, said airfoil blade having:
   (a) a pressure side;
   (b) a suction side, said sides joined together to define an airfoil shape;
   (c) a blade root attached to said shank;
   (d) a blade tip;
   (e) a longitudinal axis extending outward toward said blade tip and inward toward said blade root; and
   (f) walls defining a first generally longitudinally extending coolant passageway for channeling coolant longitudinally outward, said first passageway having a transverse cross-sectional shape of generally a triangular wedge including a base disposed proximate, and aligned generally with, said pressure side of said airfoil blade, an opposing tapered tip disposed proximate said suction side of said airfoil blade, and sides connecting said base to said tapered tip, wherein each of said sides of said wedge is not aligned with said pressure side or said suction side of said airfoil blade.

7. A rotor blade comprising a shank and an airfoil blade, said airfoil blade having:
   (a) a pressure side;
   (b) a suction side, said sides joined together to define an airfoil shape;
   (c) a blade root attached to said shank;
   (d) a blade tip;
   (e) a longitudinal axis extending outward toward said blade tip and inward toward said blade root; and
   (f) walls defining a plurality of generally longitudinally extending coolant passageways disposed in a row with adjacent said passageways interconnected to define at least a portion of a serpentine coolant circuit, each said passageway having a transverse cross-sectional shape of generally a wedge, said wedge including a base and an opposing tapered tip, said base of one of any two adjacent said passageways disposed proximate said pressure side and said tapered tip of said one passageway disposed proximate said suction side of said airfoil blade, and said base of the other of said two adjacent passageways disposed proximate said suction side and said tapered tip of said other passageway disposed proximate said pressure side of said airfoil blade.

8. The rotor blade of claim 7, wherein said base of said one passageway is aligned generally with said pressure side of said airfoil blade, and said base of said other passageway is aligned generally with said suction side of said airfoil blade.

9. The rotor blade of claim 7, wherein said wedge of at least one of said passageways has a shape of generally a trapezoid.

10. The rotor blade of claim 7, wherein said wedge of at least one of said passageways has a shape of generally a triangle.

11. The rotor blade of claim 7, wherein said plurality is at least three.

12. The rotor blade of claim 7, wherein said one passageway is a passageway for channeling coolant longitudinally outward, and said other passageway is a passageway for channeling coolant longitudinally inward.

13. The rotor blade of claim 14, wherein said one passageway is a passageway for channeling coolant longitudinally outward, and said other passageway is a passageway for channeling coolant longitudinally inward.

14. A rotor blade comprising a shank and an airfoil blade, said airfoil blade having:
    (a) a pressure side;
    (b) a suction side, said sides joined together to define an airfoil shape;
    (c) a blade root attached to said shank;
    (d) a blade tip;
    (e) a longitudinal axis extending outward toward said blade tip and inward toward said blade root; and
    (f) walls defining at least three generally longitudinally extending coolant passageways disposed in a row with adjacent said passageways interconnected to define at least a portion of a serpentine coolant circuit, each said passageway having a transverse cross-sectional shape of generally a triangular wedge, said wedge including a base and an opposing tapered tip, said base of one of any two adjacent said passageways disposed proximate, and aligned generally with, said pressure side and said tapered tip of said one passageway disposed proximate said suction side of said airfoil blade, and said base of the other of said two adjacent passageways disposed proximate, and aligned generally with, said suction side and said tapered tip of said other passageway disposed proximate said pressure side of said airfoil blade.

* * * * *